United States Patent
Hu et al.

(10) Patent No.: US 9,616,968 B1
(45) Date of Patent: Apr. 11, 2017

(54) SENSING DEVICE AND DRIVING MODULE FOR ELECTRIC BICYCLE

(71) Applicant: INDUSTRIAL TECHNOLOGY RESEARCH INSTITUTE, Hsinchu Hsien (TW)

(72) Inventors: Chia-Jui Hu, Hsinchu (TW); Shao-Yu Lee, Hsinchu (TW); Yuan-Yuan Chiang, Hsinchu (TW)

(73) Assignee: Industrial Technology Research Institute, Hsinchu County (TW)

( * ) Notice: Subject to any disclaimer, the term of this patent is extended or adjusted under 35 U.S.C. 154(b) by 0 days.

(21) Appl. No.: 14/998,205

(22) Filed: Dec. 24, 2015

(30) Foreign Application Priority Data

Dec. 4, 2015 (TW) .............................. 104140707 A

(51) Int. Cl.
| | |
|---|---|
| *B62M 6/50* | (2010.01) |
| *B62M 6/55* | (2010.01) |
| *B60L 11/00* | (2006.01) |
| *H02K 11/24* | (2016.01) |
| *H02K 13/00* | (2006.01) |
| *H02K 11/21* | (2016.01) |
| *H02K 7/116* | (2006.01) |

(52) U.S. Cl.
CPC .............. *B62M 6/50* (2013.01); *B60L 11/007* (2013.01); *B62M 6/55* (2013.01); *H02K 7/116* (2013.01); *H02K 11/21* (2016.01); *H02K 11/24* (2016.01); *H02K 13/003* (2013.01); *B60L 2200/12* (2013.01); *B60L 2250/26* (2013.01)

(58) Field of Classification Search
CPC . B62M 6/40; B62M 6/45; B62M 6/50; B62M 6/55
See application file for complete search history.

(56) References Cited

U.S. PATENT DOCUMENTS

| | | | |
|---|---|---|---|
| 5,889,378 A | 3/1999 | Hayashi | |
| 2016/0185419 A1* | 6/2016 | Bendel | .................... G01L 1/165 180/220 |
| 2016/0209281 A1* | 7/2016 | Carrasco Vergara | .. B62M 3/003 |
| 2016/0265991 A1* | 9/2016 | Dixon | ..................... G01L 13/04 |

FOREIGN PATENT DOCUMENTS

| | | |
|---|---|---|
| CN | 2348374 Y | 11/1999 |
| CN | 102317146 A | 1/2012 |

(Continued)

OTHER PUBLICATIONS

Björn Helander, "Intergrated Torque Sensor for E-Bike Motors",Master's Thesis Approved Jun. 12, 2014, Lunds Univeristet,Faculty of Engineering, LTH Departmetn of Biomedical Engineering, p. 1-66.

(Continued)

*Primary Examiner* — Kevin Hurley

(74) *Attorney, Agent, or Firm* — Muncy, Geissler, Olds & Lowe, P.C.

(57) ABSTRACT

A sensing device and a driving module for an electric bicycle having a spindle are provided. The sensing device includes a torque sensor, a slip ring, a grating, and a cadence sensor. The driving module includes a motor, a reducer and the sensing device. The present disclosure combines the slip ring with the grating to integrate the cadence sensor and the torque sensor into one sensing device, such that the sizes of the sensing device and the driving module are reduced.

20 Claims, 5 Drawing Sheets

(56) References Cited

FOREIGN PATENT DOCUMENTS

| CN | 103879506 A | 6/2014 |
| --- | --- | --- |
| CN | 104236782 A | 12/2014 |
| CN | 104843132 A | 8/2015 |
| DE | 20 2014 100 292 U1 | 5/2014 |
| EP | 2 998 211 A1 | 3/2016 |
| GB | 2488139 A | 8/2012 |
| TW | 243834 | 3/1995 |
| TW | 349525 U | 1/1999 |
| TW | 493746 U | 7/2002 |
| TW | M417320 U | 12/2011 |

OTHER PUBLICATIONS

Richard D. Hall, Roland P. Roberge, Gary Lozowski, Morgan AM&T, "*Carbon Brush Performance on Slip Rings*", Mining Electrical Maintenance and Safety Association, Sep. 9, 2010, Clearwater, FL. p. 1-90.

Marie Van Ditten, "*Torque Sensing for E-Bike Applications*", Master's Thesis, Delft University of Technology, Faculty of Mechanical, Maritime and Materials Engineering, Jun. 27, 2011, p. 1-146.

Gaurav Puri, "Optical Sensors and Their Applications" Electrical Engineering Suny at Buffalo, gapuri@buffalo.edu, p. 1-29.

Stephen R. Forrest (Panel Chair), Larry A. Coldren, Sadik C. Esener, Donald B. Keck, Frederick J. Leonberger, Gary R. Saxonhouse, Paul W. Shumate, "*Optoelectronics in Japan and the United States*", Feb. 1996, JTEC/WTEC Program, Loyola College in Maryland, p. 1-385.

"Carbon Brush & Holder Technical Handbook", Morgan Advanced Materials, www.morganadvancedmaterilas.com, p. 1-20.

\* cited by examiner

SENSING DEVICE AND DRIVING MODULE FOR ELECTRIC BICYCLE

CROSS-REFERENCE TO RELATED APPLICATION

The present disclosure is based on, and claims priority from Taiwan Application Number 104140707, filed on Dec. 8, 2015, the disclosure of which is hereby incorporated by reference herein in its entirety.

TECHNICAL FIELD

The technical field relates to a sensing device and a driving module, and, more particularly, to a sensing device and a driving module for an electric bicycle.

BACKGROUND

Many governments in the world encourage replacing vehicle consuming petrol or diesel with electric vehicle considering the global warming issue, such that carbon emissions can be reduced to alleviate the effect of global warming.

In the current industry of electric vehicle, a bicycle with a mid-mounted power system disposed in a spindle shell is major and advantages in riding comfort and reliability. The bicycle with a mid-mounted power system detects, the deformation of a bottom racket of the bicycle through a torque sensor. A motor outputs power based on the detected deformation. The bigger the deformation of the spindle is detected, the stronger the power is output by the motor, while the smaller the deformation of the spindle is detected, the weaker the power is output by the motor. Alternatively, the power output by the motor is based on the cadence frequency detected by a cadence sensor of the bicycle.

However, there are defects for both sensing mechanisms mentioned above. For example, when riding a bicycle with the torque sensor, if the rider stops pedaling to rest himself, the motor will continuously output power due to the deformation of the spindle, such that battery power is unnecessarily consumed. When riding a bicycle with the cadence sensor, if the rider rides uphill, the motor will output weaker power due to the reduced cadence frequency. Consequently, the rider spends more energy to pass an uphill section.

Moreover, both sensors mentioned above are mounted in different locations of the bicycle. Specifically, the cadence sensor is usually based on magnetic induction or eddy current induction, such that the cadence sensor should be mounted away from the motor to prevent magnetic interference. However, the torque sensor has to be mounted on the spindle to detect the deformation, such that integrating the two sensors in one bicycle results in a bulky bicycle that cannot be easily ridden.

Given the foregoing, persons skilled in the art have desired to find a solution to integrate the two sensors in one bicycle without making such bicycle oversize.

SUMMARY

One embodiment of the disclosure provides a sensing device for an electric bicycle having a spindle, comprising: a torque sensor disposed on the spindle and configured to sense the spindle to obtain a torque signal; a slip ring strung and disposed on the spindle, and configured to synchronously rotate with the spindle, wherein the slip ring is electrically connected to the torque sensor and configured to transmit the torque signal; a grating strung and disposed on the spindle, wherein the grating is disposed within the slip ring and configured to synchronously rotate with the slip ring; and a cadence sensor disposed opposite to the grating and configured to sense rotation of the grating to obtain a cadence signal.

Another embodiment of the disclosure provides a driving module for an electric bicycle having a spindle. The driving module includes a reducer strung and disposed on the spindle; a motor strung and disposed on the spindle and configured to transmit power to the reducer; and a sensing device. The sensing device includes a torque sensor disposed on the spindle and configured to sense the spindle to obtain a torque signal; a slip ring strung and disposed on the spindle and configured to synchronously rotate with the spindle, wherein the slip ring is electrically connected to the torque sensor and configured to transmit the torque signal; a grating strung and disposed on the spindle, wherein the grating is disposed within the slip ring and configured to synchronously rotate with the slip ring; and a cadence sensor disposed opposite to the grating and configured to sense rotation of the grating to obtain a cadence signal, wherein the motor and the reducer are configured to operate in accordance with the cadence signal and the torque signal.

The present disclosure combines the slip ring with the grating to integrate the cadence sensor and the torque sensor into one sensing device, such that the sizes of the sensing device and the driving module can be reduced. As such, the sensing device mounted on the electric bicycle would not cause the oversize and magnetic interference problems.

DETAILED DESCRIPTION

Figure 1:
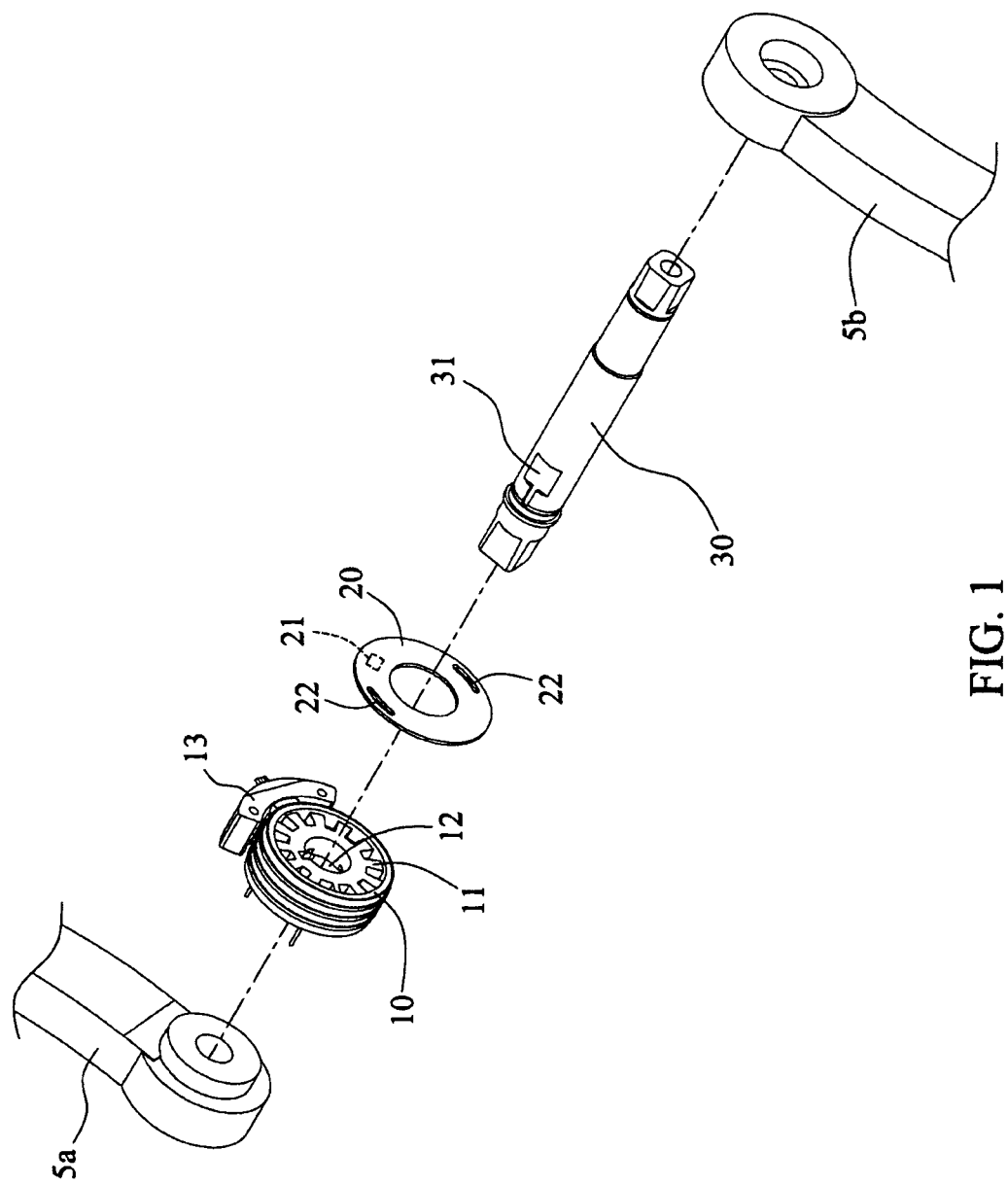
FIG. 1 illustrates an exploded scheme view of a sensing device of the electric bicycle according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 illustrates an exploded scheme view of a sensing device of an electric bicycle according to an embodiment of the present disclosure.

As shown in FIG. 1, the sensing device includes (from the left to the right) a left crank 5a, a slip ring 10, a grating 11, a brush 13, a securing board 20, a cadence sensor 21, a spindle 30, a torque sensor 31, and a right crank 5b.

The left crank 5a and the right crank 5b are disposed on the left and right ends of the spindle 30, respectively. When applied to the left crank 5a and the right crank 5b, the power is transmitted to the spindle 30 through the left crank 5a and right crank 5b, such that the spindle 30 is deformed.

The torque sensor 31, such as a resistance strain gauge, is attached to the spindle 30 and may provide resistance varying with the deformation of the spindle. As such, a torque signal is detected. The torque sensor 31 is electrically connected with the slip ring 10.

The slip ring 10 is strung and disposed on the spindle 30, such that the slip ring 10 synchronously rotates with the spindle 30. The slip ring 10 may transmit power, which may be supplied by a motor of a driving module illustrated in FIG. 4, to the torque sensor 31, and transmit the detected torque signal to a controller (not shown) through the brush 13. The grating 11 is penetrated by the spindle 30 through a penetration hole 12, such that the grating 11 is strung and disposed on the spindle 30. The grating is secured and disposed within the slip ring 10, such that the grating 11 synchronously rotates with the slip ring 10. Specifically, the slip ring 10 has opposite ends, and the grating 11 can be disposed on one of the opposite ends. As shown in FIG. 1, the grating 11 can be disposed on one of the opposite ends that face the right crank 5b. In an embodiment, the grating 11 may also be disposed on another one of the opposite ends that faces the left crank 5a. In another embodiment, the grating 11 can be made of a plastic material or the like. The detailed structure of the grating 11 will be described as follows.

Figure 4:
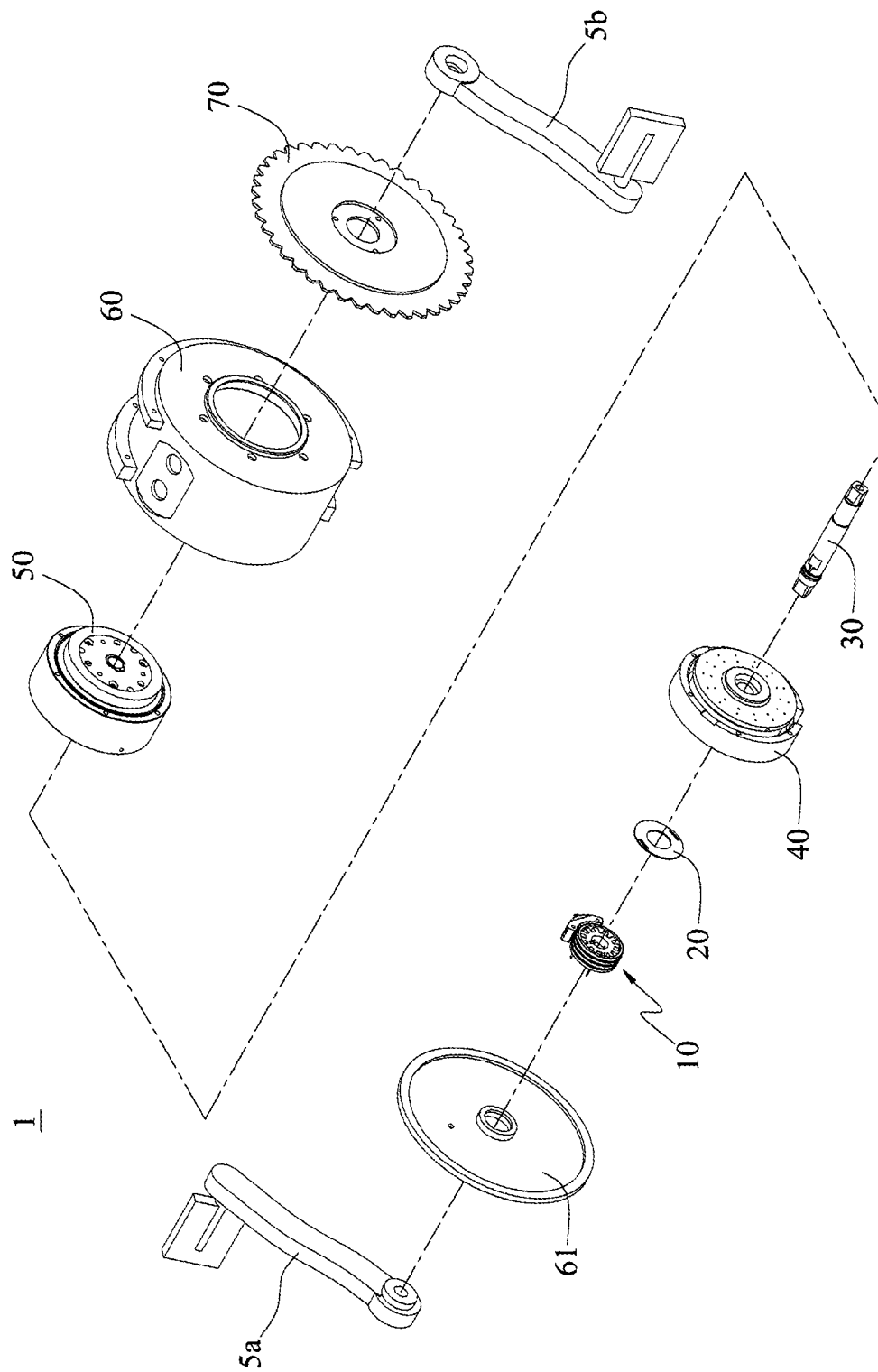
FIG. 4 illustrates an exploded scheme view of a driving module of the electric bicycle according to an embodiment of the disclosure.

The securing board 20 has the cadence sensor 21 and a hole 22 disposed thereon. The cadence sensor 21 and the grating 11 are oppositely arranged, such that the cadence sensor 21 detects the rotation of the grating 11 to obtain a cadence signal. The hole 22 is utilized to mount the securing board 20 on a stator of a motor 40 with a screw, as shown in FIG. 4. The securing board 20 does not synchronously rotate with the slip ring 10, the grating 11, and the spindle 30. In an embodiment, when the grating 11 is disposed on the slip ring 10 and faces the right crank 5b, the securing board 20 and the cadence sensor 21 may be disposed between the slip ring and the right crank 5b, such that the cadence sensor 21 and the grating 11 are oppositely arranged. In another embodiment, when the grating 11 is disposed on the slip ring 10 and faces the left crank 5a, the securing board 20 and the cadence sensor 21 may be disposed between the slip ring and the left crank 5a, such that the cadence sensor 21 and the grating 11 are oppositely arranged. The cadence sensor 21 can be, but not limited to a laser sensor, an infrared sensor, a photosensitive member, or an acoustic sensor. Any sensing device that detects the change of the grating 11 can be utilized as the cadence sensor.

The spindle 30 is provided to string and dispose the slip ring 10, the grating 11, and the securing board 20 thereon, and the left crank 5a and the right crank 5b are secured on the left and right ends of the spindle, respectively, where the slip ring 10 and the grating 11 synchronously rotate with the spindle 30 while the securing board 20 does not rotate with the spindle 30. Also, the torque sensor 31 is electrically connected to an electrode 14 of the slip ring 10, as shown in FIG. 2, such that the torque signal of the spindle 30 detected by the torque sensor 31 is transmitted to the controller through the electrode 14 and the brush 13.

Figure 2:
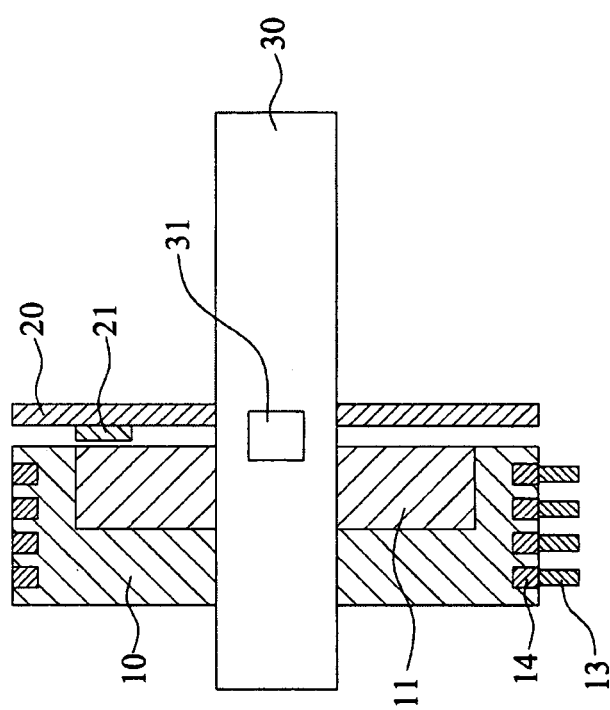
FIG. 2 illustrates a lateral sectional scheme view of the sensing device of the electric bicycle according to an embodiment of the disclosure.

FIG. 2 illustrates a lateral sectional scheme view of the sensing device of the electric bicycle according to an embodiment of the present disclosure.

As shown in FIG. 2, the slip ring 10, the grating 11, and the securing board 20 are strung and disposed on the spindle 30, and the slip ring and the grating 11 synchronously rotate with the spindle 30 while the securing board 20 does not rotate with the spindle 30. When power is applied on the spindle 30 to cause deformation, the torque sensor 31 transmits the detected torque signal of the spindle 30 to the controller (not shown) through the electrode 14 and the brush 13.

In an embodiment, the cadence sensor 21 and the grating 11 are oppositely arranged. When the spindle 30 drives the slip ring 10 to rotate, the cadence sensor 21 detects the rotation of the grating 11 to obtain a cadence signal, and transmits the cadence signal to the controller. For example, the cadence sensor 21 includes an emitting unit and a receiving unit (both of which are not shown). The emitting unit emits light or other electromagnetic wave such as infrared ray to the grating 11, and the grating 11 has a rib-shape structure enabling the electromagnetic wave reflected by the grating 11 to present a pulse sequence. Accordingly, the rotation speed of the grating 11, as well as the slip ring 10, can be detected, and the cadence signal is thus obtained by the cadence sensor.

Figure 3B:
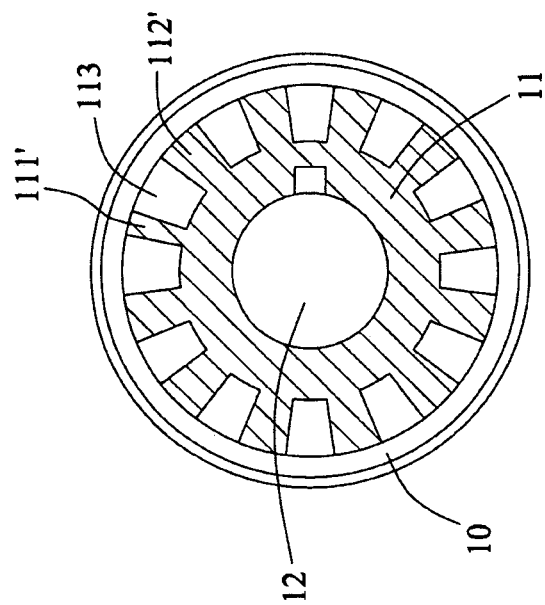
FIG. 3B illustrates another grating of the sensing device of the electric bicycle according to an embodiment of the disclosure.
Figure 3A:
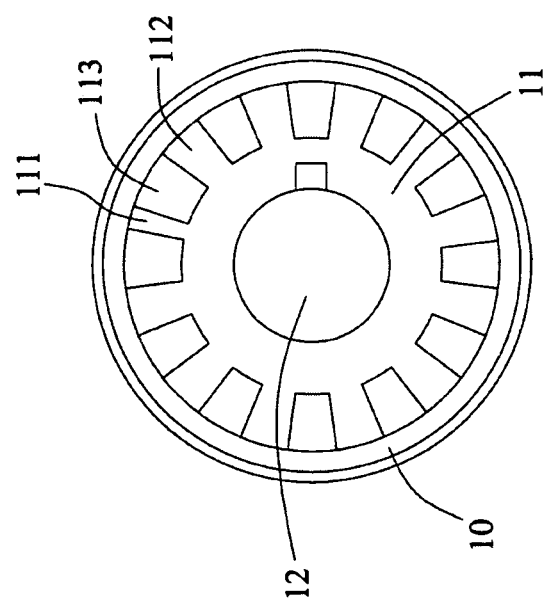
FIG. 3A illustrates a grating of the sensing device of the electric bicycle according to an embodiment of the disclosure.

FIG. 3A illustrates a grating of the sensing device of the electric bicycle according to an embodiment of the present disclosure. FIG. 3B illustrates another grating of the sensing device of the electric bicycle according to an embodiment of the present disclosure.

As shown in FIG. 3A, the slip ring 10 has the grating 11 disposed therein. The grating 11 has a plurality of rib-shape structures, such as rib-shape structure 111 and rib-shape structure 112, and separating portions such as separating portion 113 radially extending from the penetration hole 12. In an embodiment, the separating portion 113 is formed and recessed into a notch of a surface of the grating 11, such that the spacing between adjacent notches defines the widths of the rib-shape structure 111 and the rib-shape structure 112. In another embodiment, the rib-shape structure 111 and the rib-shape structure 112 are recessed into the surface of the grating 11, such that the separating portion 113 forms a projection, and the spacing between adjacent projections defines the widths of the rib-shape structure 111 and the rib-shape structure 112. In yet another embodiment, the rib-shape structure 111 and the rib-shape structure 112 project from the surface of the grating 11. It should be noted that the plurality of rib-shape structures of the grating 11 may have identical dimensions (i.e., length, width, and height). Alternatively, as shown in FIGS. 3A and 3B, at least one of the rib-shape structures 111 has a width different from that of another one of the rib-shape structures 112 and serves as the beginning of detection.

As shown in FIG. 3B, the slip ring 10 is substantially identical to the slip ring 10 illustrated in FIG. 3A except that they have different types of gratings 11. Specifically, the grating 11 includes a plurality of pattern portions, such as pattern portions 111' and pattern portion 112', and separating portions such as separating portion 113 are radially extended from the penetration hole 12. The pattern portions 111', the pattern portion 112', and the separating portion 113 have different colors (shown with different types of shade lines), such that the cadence sensor 21 obtains the cadence signal of the slip ring 10 by the manner of image recognition. In an embodiment, a reflective material may be attached to the pattern portions 111' and pattern portion 112', such that the pattern portions 111' and the pattern portion 112' can be distinguished from separating portion 113 by the characteristic of brightness and darkness. In another embodiment, the grating 11 includes a plurality of strips (not shown) formed on a surface of the grate 11, and different strips can reflect different amounts of light, such that the cadence sensor 21 can sense the rotation of the grating 11. As such, the cadence sensor 21 obtains the cadence signal by receiving the image or reflected light from the grating 11. In an embodiment, at least one of the pattern portions has a width different from that of another one of the pattern portions. Alternatively, the pattern portions all have identical dimensions (i.e., length, width, and height).

The cadence sensor 21 oppositely arranged with the grating 11, when detecting the rotation of the grating 11, obtains the rotation speed of the grating by the height difference between the rib-shape structure 111 and the separating portion 113 or the color difference between the pattern portion 111' and the separating portion 113. In other words, the cadence frequency of the left crank 5a or the right crank 5b can be obtained.

Moreover, the widths of the rib-shape structure 111 and the pattern portion 111' are different from the width of other plural rib-shape structure 112 and pattern portions 1112'. As such, when the cadence sensor 21 detects the grating 11, the accuracy can be further controlled by the rotation angle of the slip ring 10 calculated based on the difference of width.

FIG. 4 illustrates an exploded scheme view of a driving module of the electric bicycle according to an embodiment of the present disclosure.

As shown in FIG. 4, the driving module 1 includes (from the left to the right) a left crank 5a, a cover 61, a slip ring 10, a securing board 20, a motor 40, a spindle 30, a reducer 50, a housing 60, a chain plate 70 and a right crank 5b.

Since the left crank 5a, the slip ring 10, the securing board 20, the spindle 30, and the right crank 5b are identical to corresponding components illustrated in FIG. 1, the detailed description thereof are not repeated herewith.

The motor 40 is strung and disposed on the spindle 30, where the rotor of the motor 40 is coaxial with the spindle 30 and the stator of the motor 40 does not rotate with the spindle 30. The reducer 50 is strung and disposed on the spindle 30, and the motor 40 is coupled to the reducer 50 to provide power. The reducer 50 reduces the rotation speed of the motor 40 and increases the torque of the motor 40. In an embodiment, the motor 40 can be a synchronous motor, an induction motor, a reversible motor, a stepper motor, a servomotor, or a linear motor. In another embodiment, the reducer 50 may be a gear reducer, a worm reducer, a planetary gear reducer, a cycloid reducer, or a harmonic gear reducer.

The cover 60 and the housing 61 are utilized to cover the slip ring 10, the securing board 20, the motor 40, the spindle 30, and the reducer 50 to protect respective components. In an embodiment, the cover 60 and the housing 61 are, for example, made of plastic materials.

It should be noted that the securing board 20 can be secured to the motor 40 by screwing through the hole 22, as shown in FIG. 2, or can be additionally arranged on a circuit board disposed outside the motor 40 or inside the housing 61 such that the securing board 20 is oppositely arranged with the grating 11. Alternatively, the securing board 20 is a circuit board in the motor 40, i.e., the circuit board of the cadence sensor 21 disposed inside or outside the motor. The cadence sensor 21 receives power through the circuit board and transmits the cadence signal.

The chain plate 70 functions as the chain plate for a traditional bicycle, and is strung and disposed on the spindle 30 to synchronously rotate with the spindle 30. Also, the chain plate 700 is connected with the reducer 50, such that the chain plate 70 transmits the power provided by the reducer 50 to the electric bicycle through a chain (not shown). For example, the power may be transmitted to a front wheel or a rear wheel of the electric bicycle.

In an embodiment, the driving module 1 may be configured, for example, as a left crank 5a, a slip ring 10, a securing board 20, a motor 40, a reducer 50, a chain plate 70 and a right crank 5b.

In another embodiment, the driving module 1 may be configured, for example, as a left crank 5a, a motor 40, a reducer 50, a slip ring 10, a securing board 20, a chain plate 70 and a right crank 5b.

Figure 5A:
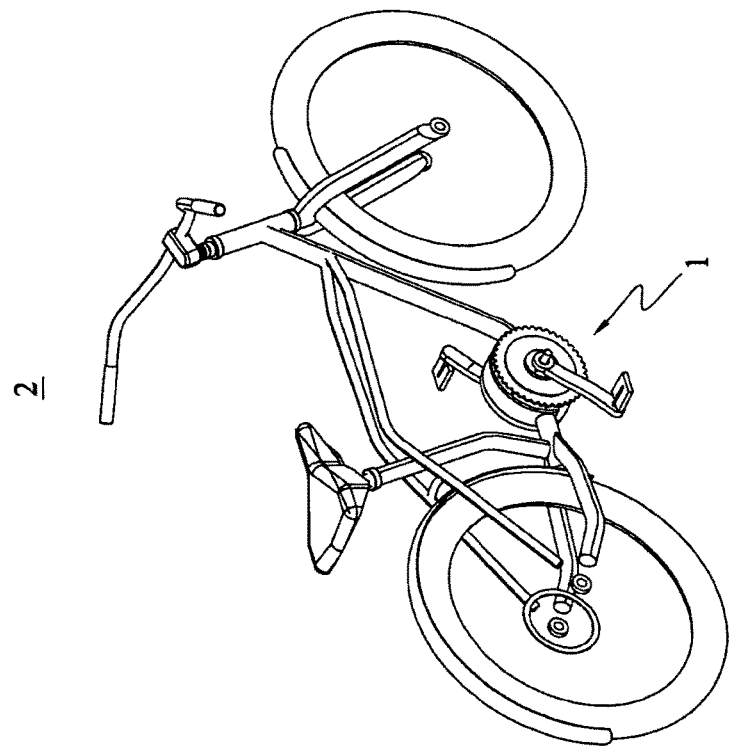
FIG. 5A illustrates an assembling view of the driving module of the electric bicycle according to an embodiment of the disclosure.
Figure 5B:
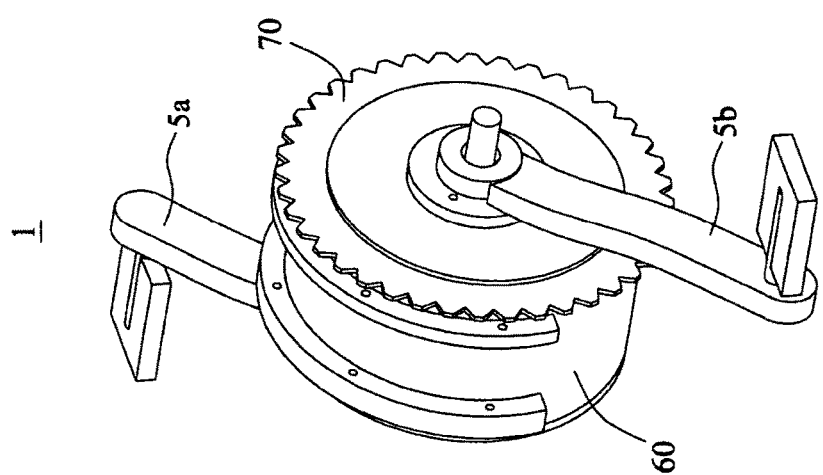
FIG. 5B illustrates a scheme view of the electric bicycle with the driving module according to an embodiment of the disclosure.

FIG. 5A illustrates an assembling view of the driving module of the electric bicycle according to an embodiment of the present disclosure. FIG. 5B illustrates a schematic view of the electric bicycle with the driving module according to an embodiment of the present disclosure.

As shown in FIGS. 5A and 5B, the driving module 1 according to the present disclosure can be mounted at the spindle of the electric bicycle. Also, the driving module 1 only takes a small volume of the electric bicycle 2, such that the size of the electric bicycle can be controlled. Accordingly, a rider can comfortably ride the electric bicycle in accordance to this disclosure.

In summary, the present disclosure combines the slip ring with the grating to integrate the cadence sensor and the torque sensor into one sensing device, such that the sizes of the sensing device and the driving module can be reduced. As such, the sensing device mounted on the electric bicycle would not cause the oversize and magnetic interference problems.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A sensing device for an electric bicycle having a spindle, comprising:
   a torque sensor disposed on the spindle, and configured to sense the spindle to obtain a torque signal;
   a slip ring strung and disposed on the spindle, and configured to synchronously rotate with the spindle, wherein the slip ring is electrically connected to the torque sensor to transmit the torque signal;
   a grating strung and disposed on the spindle, wherein the grating is disposed within the slip ring and configured to synchronously rotate with the slip ring; and
   a cadence sensor disposed opposite to the grating and configured to sense rotation of the grating to obtain a cadence signal.

2. The sensing device of claim 1, wherein the grating comprises a penetration hole penetrating the grating, and the spindle penetrates the penetration hole for the spindle to be secured therein.

3. The sensing device of claim 2, wherein the grating further comprises a plurality of rib-shape structures radially extend from the penetration hole.

4. The sensing device of claim 3, wherein the grating further comprises a plurality of notches radially extending from the penetration hole and recessed from a surface of the grating, and each of the rib-shape structures has a width defined by a spacing of the notches adjacent thereto.

5. The sensing device of claim 3, wherein the rib-shape structures project from or are recessed into a surface of the grating.

6. The sensing device of claim 3, wherein at least one of the rib-shape structures has a width different from a width of another one of the rib-shape structures.

7. The sensing device of claim 2, wherein the grating further comprises a plurality of pattern portions formed on a surface of the grating.

8. The sensing device of claim 2, wherein the grating further comprises a plurality strips formed on a surface of the grating and configured to reflect different amounts of light.

9. The sensing device of claim 1, wherein the cadence sensor is disposed in a circuit board inside or outside a motor of the electric bicycle and is free from rotating with the spindle.

10. The sensing device of claim 9, wherein the cadence sensor is configured to receive power and transmit the cadence signal via the circuit board.

11. A driving module for an electric bicycle having a spindle, comprising:
   a reducer strung and disposed on the spindle;
   a motor strung and disposed on the spindle and configured to transmit power to the reducer; and
   a sensing device, comprising:
      a torque sensor disposed on the spindle and configured to sense the spindle to obtain a torque signal;
      a slip ring strung and disposed on the spindle, and configured to synchronously rotate with the spindle, wherein the slip ring is electrically connected to the torque sensor and configured to transmit the torque signal;
      a grating strung and disposed on the spindle, wherein the grating is disposed within the slip ring and configured to synchronously rotate with the slip ring; and
      a cadence sensor disposed opposite to the grating and configured to sense rotation of the grating to obtaining a cadence signal,
   wherein the motor and the reducer operate in accordance with the cadence signal and the torque signal.

12. The driving module of claim 11, wherein the grating comprises a penetration hole penetrating the grating, and the spindle penetrates the penetration hole for the spindle to be secured therein.

13. The sensing module of claim 12, wherein the grating further comprises a plurality of rib-shape structures radially extend from the penetration hole.

14. The driving module of claim 13, wherein the grating further comprises a plurality of notches radially extending from the penetration hole and recessed from a surface of the grating, and each of the rib-shape structures has a width defined by a spacing of the notches adjacent thereto.

15. The driving module of claim 13, wherein the rib-shape structures project from or are recessed into a surface of the grating.

16. The driving module of claim 13, wherein at least one of the rib-shape structures has a width different from a width of another one of the rib-shape structures.

17. The driving module of claim 12, wherein the grating further comprises a plurality of pattern portions formed on a surface of the grating.

18. The driving module of claim 12, wherein the grating further comprises a plurality of strips formed on a surface of the grating and reflecting different amounts of light.

19. The driving module of claim 11, wherein the cadence sensor is disposed in a circuit board inside or outside a motor of the electric bicycle and is free from rotating with the spindle.

20. The driving module of claim 19, wherein the cadence sensor is configured to receive power and transmit the cadence signal via the circuit board.

* * * * *